United States Patent Office 3,165,306
Patented Jan. 12, 1965

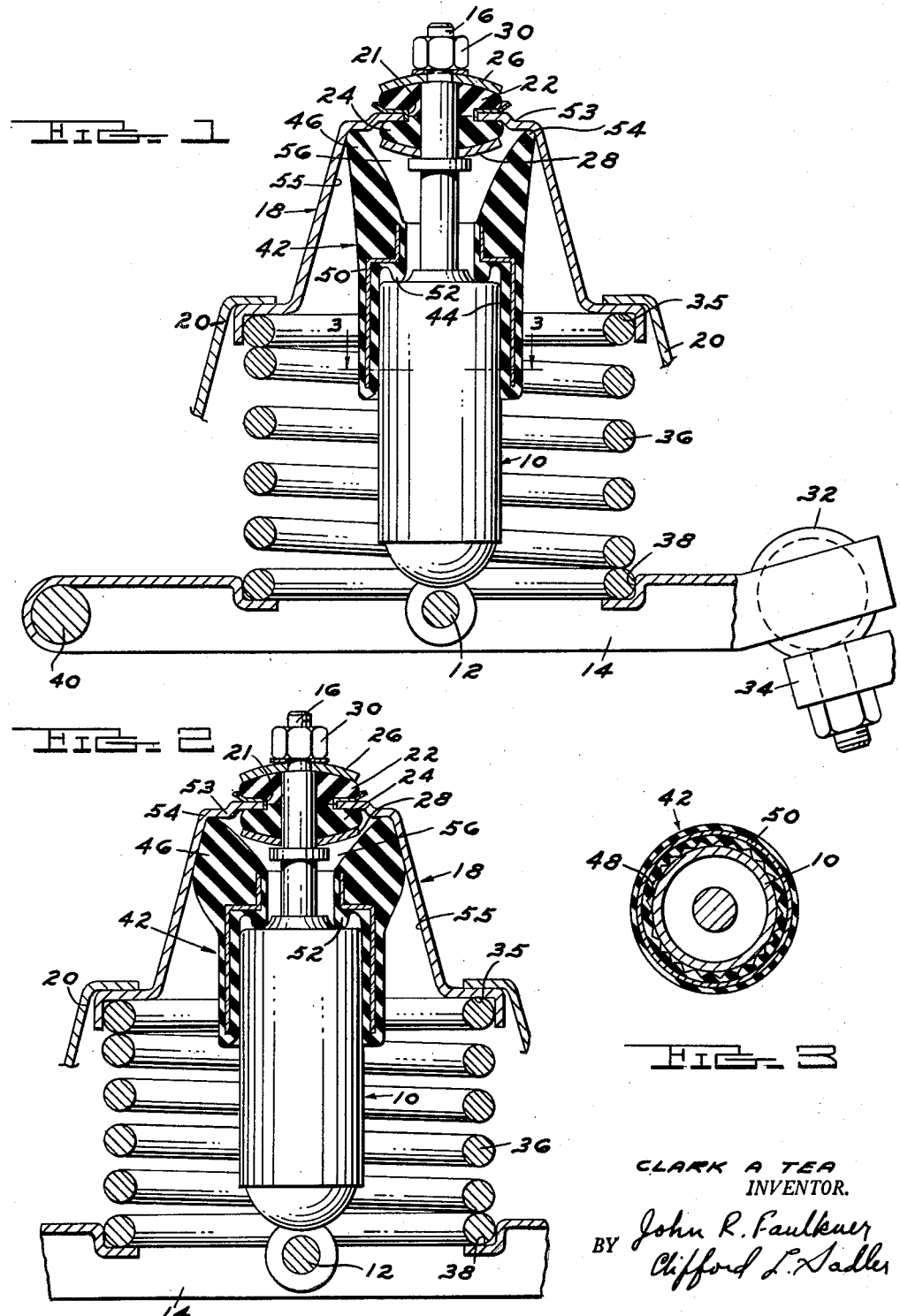

3,165,306
RESILIENT STOP MEANS
Clark A. Tea, Southfield, Mich., assignor to Ford Motor Company, Dearborn, Mich., a corporation of Delaware
Filed Aug. 10, 1961, Ser. No. 130,585
6 Claims. (Cl. 267—8)

The present invention relates to vehicle suspensions, and more particularly to resilient stop means adapted to limit extreme relative movement of suspension components.

It is conventional to interpose direct acting hydraulic shock absorbers between sprung and unsprung components of a motor vehicle suspension in order to provide a dampening resistance to relative movement between these components. Where operating conditions cause maximum deflection of the unsprung members relative to the sprung portion of the vehicle, mechanical provisions must be made to limit extreme movements in order to prevent damage to the shock absorber and other vehicle suspension parts. In vehicles having separable body and frame construction it has been common practice to provide a rubber stop affixed to the lower wheel support arm and a striking bracket welded to the frame. Contact of these members arrests relative movement.

In a unit body vehicle where the frame is integrally formed of body sheet metal it is not always possible to conveniently provide a bracket against which the rubber stop may strike. Several solutions have been proposed for this problem, however, most have the disadvantage that they are expensive and require an excessive number of additional parts or manufacturing operations.

Therefore, it is an object of the present invention to provide an arresting means between sprung and unsprung components of a vehicle suspension system which is characterized by simplicity and economy. It is also a quality of the present invention to provide a motion arresting means which has a highly favorable force build-up curve.

More specifically, the present invention provides, in its presently preferred embodiment, an annular rubber member that is attached to the upper end of the reservoir tube of a shock absorber. A cup-shaped body bracket holds the end of the piston rod for the shock absorber. During extreme jounce, the rubber bumper strikes the inside of the cup-shaped bracket and defines a trapped air chamber therewith. As further jounce movement occurs the rubber is deformed to complement the interior configuration of the attaching bracket. The trapped air is compressed to provide a progressively increasing resistance ot further movement.

The retarding force builds up very slowly at first until the outwardly expanding rubber comes into full contact with the inner wall of the cup-shaped mounting bracket. At this point the compression rate of the trapped air is rapidly increased to provide a very high resistance to further deflection. This permits use of relatively soft rubber and, consequently, a very low rate of resistance occurs during the initial contact of the rubber with the bracket. The configuration of the rubber bumper and of the cup-shaped bracket may be altered to obtain the optimum rate of resistance build-up. An additional feature of the present invention is the increased hysteresis of air over the rubber which diminishes the speed of rebound of the unsprung suspension components.

Further objects and advantages of the present invention will be amply apparent from the following description and the accompanying drawing, in which:

FIGURE 1 is an elevational view in section of a vehicle suspension system incorporating the presently preferred embodiment of this invention;

FIGURE 2 is an elevational view corresponding to FIGURE 1 showing the suspension parts in extreme jounce position; and, FIGURE 3 is a sectional view taken along section line 3—3 of FIGURE 1.

Referring now to the drawings for a more detailed description, wherein like reference numerals identify like parts throughout the various views, the present invention provides a shock absorber 10 interposed between sprung and unsprung suspension components of a motor vehicle. The lower end of the shock absorber 10 is pivotally connected at 12 to a suspension arm 14. The upper end of the shock absorber has a piston rod 16 affixed to sprung body structure.

The shock absorber 10 is of the conventional direct acting reciprocating type. The piston rod 16 carries a valved piston which is reciprocally received within the body of the shock absorber 10 to control relative movement.

The upper end of the piston rod 16 is affixed to a cup-shaped bracket 18 which in turn is welded to body structure 20. The mounting bracket 18 has an opening 21 through which the shock absorber piston rod 16 passes. A pair of doughnut shaped rubber bushings 22 and 24 are positioned about the opening 21 and are trapped between washers 26 and 28. A nut 30 secures the end of the piston rod 16 to the bracket 18 by clamping the washers 26, 28 and bushings 22, 24 in position at the opening 21.

The outer end of the suspension arm 14 receives a ball joint assembly 32 to which a wheel supporting spindle 34 is affixed. The spindle 34 rotatably carries the road wheel of the suspension system.

The lower end 35 of the downwardly facing shock absorber mounting bracket 18 serves as the upper seat for a coil suspension spring 36. A lower spring seat is provided at 38 in the suspension arm 14. The spring member 36 permits the vehicle body to be resiliently supported on the unsprung portions of the suspension system. The suspension arm 14 is pivotally mounted at 40 on sprung body structure. When the arm 14 oscillates about the pivot 40 in jounce, the spring 36 is compressed and during rebound the coil spring 36 extends.

In order to accommodate extreme jounce movement of the unsprung components, a rubber stop mechanism of unique construction is provided. In the presently preferred embodiment the rubber stop of this invention includes an annular shaped rubber body 42 that has a lower skirt portion 44 fitted about the outer casing of the shock absorber 10. The upper end 46 of the rubber body 42 is flared upwardly and outwardly. It will be noted from FIGURE 3 that the skirt portion 44 has inwardly facing serrations 48 to permit the rubber body 42 to be fitted tightly about the outer casing of the shock absorber 10. A spring metal piece 50 is molded into the interior of the rubber body 42. This metal piece 50 helps the skirt portion 44 to retain its configuration and keep it in tight contact about the shock absorber 10.

As indicated in the drawings, the rubber body 42 is provided with a depending lip 52 that is seated in sealed engagement on the upper end of the shock absorber 10.

The mounting bracket 18 has a flat base portion 53 to receive the piston rod 16. The base portion 53 extends to the corner 54 where it meets the downwardly and outwardly directed wall 55 portion.

The mouth at the flared upward end 46 of the rubber body 42 has an upper diameter that is equal to and complements the configuration at 54 of the mounting bracket 18.

In normal operation, reciprocation of the arm 14 will cause the rubber body 42 to come into only light contact with the bracket member 18, such as illustrated in FIGURE 1. It will be noted that when the upper edge 46 contacts the bracket 18 at the corner 54 a seal is created.

Pressure on the bushings 22, 24 will cause the opening 21 to be sealed. The lower portion of the rubber body 42 is sealed by the lip 52 to the body of the shock absorber 10. Thus these several sealed engagements cause a trapped air chamber 56 to be defined. As seen in FIGURE 2, upon extreme jounce the trapped air chamber 56 is reduced in size creating air compression to resist further deflection of the suspension components.

The deformation of the rubber body 42 also resists movement. The original contact of the rubber body 52 with the bracket 18 is by the relatively thin edge 46. As further deflection occurs, the rubber body deforms to a considerable extent. The compression of the air pressure in the chamber 56 causes the rubber to expand outwardly to come into contact with the sloping wall 55 of the bracket 18. The configuration of the rubber 42 and the manner in which it deforms plus the pressure exerted by the compressed air within the chamber 56 creates an ever increasing resistance to extreme deflection of the unsprung suspension components.

The retarding force builds up very slowly until the outwardly expanding rubber comes into solid contact with the lateral surface of the enveloping bracket 18. At that point, the compression rate of the air is rapidly increased to produce a very high resistance to further jounce deflection. This permits use of relatively soft rubber and, consequently, very low rate of resistance build-up at the beginning of jounce. Thus, the space between the rubber and the surrounding wall of the bracket is important and can be adjusted to obtain the desired rate of retardation. Another advantage of this invention is the vastly increased hysteresis of air over rubber alone. This diminishes the speed of rebound.

The foregoing description presents the preferred embodiment of this invention. Alterations and modifications may occur to those skilled in the art which will come within the scope and spirit of the following claims.

I claim:

1. In a vehicle suspension system having sprung and unsprung components, a pivotally mounted suspension arm interposed between said components, said sprung components having a cup-shaped mounting bracket, a telescopic direct acting shock absorber interposed between said bracket and said suspension arm, said shock absorber having a body portion secured to said arm, an annular rubber body surrounding said shock absorber body and secured in sealed engagement therewith, said rubber body having an upstanding mouth engageable with said bracket, said construction being adapted to limit extreme suspension deflection by trapping air between said rubber body and said bracket thereby causing said rubber body to expand outwardly towards the inside of said bracket upon relative movement between said components.

2. In a vehicle suspension system having sprung and unsprung components, a pivotally mounted suspension arm interposed between said components, said sprung components having a cup-shaped mounting bracket, a telescopic direct acting shock absorber interposed between said bracket and said suspension arm, said bracket having a base portion and a depending wall portion, said shock absorber having a piston rod connected to the said base portion, an annular rubber body surrounding and secured to the body of said shock absorber and in sealed engagement therewith, said rubber body having an upstanding mouth directed toward the inside of said bracket and engageable with said bracket, the diameter of said mouth being approximately equal to the base of said bracket, said construction being adapted to resiliently retard extreme suspension jounce deflection by trapping air between said rubber body and the inside of said bracket and by expanding said rubber body outwardly towards the depending wall portion.

3. A vehicle suspension system having relatively movable first and second parts, a telescopic shock absorber having first and second relatively movable components connected to said first and second parts respectively, said first part having an aperture therein, said first component being connected to said first part at said aperture by first resilient means, a rubber member secured to said second component and having a flared open mouth normally spaced from said first part constructed to engage said first part upon movement of said second part toward said first part and to define an enclosed air space therewith, said open mouth being of greater size than said first resilient means.

4. A vehicle suspension system having relatively movable first and second parts, a telescopic shock absorber having first and second relatively movable components connected to said first and second parts respectively, said first part comprising a cup-shaped sheet metal member having an aperture therein, said first component being connected to said first part at said aperture by first resilient means, a rubber member secured to said second component and having an open mouth normally spaced from said first part, said rubber member being adapted to engage said sheet metal member upon movement of said second part toward said first part and to define an enclosed air space therewith.

5. In a vehicle suspension system having sprung and unsprung components, one of said components having a cup-shaped mounting bracket, a telescopic direct acting shock absorber interposed between said bracket and the other of said components, said shock absorber having a body portion secured to said other component, an annular rubber body surrounding said shock absorber body and secured in sealed engagement therewith, said rubber body having an upstanding flared mouth normally spaced from said bracket, said mouth being constructed to engage said bracket upon jounce movement of the unsprung component and to limit extreme suspension deflection by trapping air between said rubber body and said bracket thereby causing said rubber body to expand outwardly towards the inside of said bracket upon relative movement between said components.

6. In a vehicle suspension system having sprung and unsprung components, one of said components having a cup-shaped mounting bracket, a telescopic direct acting shock absorber interposed between said bracket and the other of said components, said bracket having a base portion and a depending wall portion, said shock absorber having a piston rod connected to the said base portion, an annular rubber body surrounding and secured to the body of said shock absorber and in sealed engagement therewith, said rubber body having an upstanding mouth directed toward the inside of said bracket and engageable with said bracket, the diameter of said mouth being approximately equal to the base of said bracket, said construction being adapted to resiliently retard extreme suspension jounce deflection by trapping air between said rubber body and the inside of said bracket and by expanding said rubber body outwardly toward the depending wall portion.

References Cited in the file of this patent

UNITED STATES PATENTS

| | | |
|---|---|---|
| 2,314,505 | McIntyre et al. | Mar. 23, 1943 |
| 2,537,634 | Brown | Jan. 9, 1951 |
| 2,592,391 | Butterfield | Apr. 8, 1952 |
| 2,981,534 | Peras | Apr. 25, 1961 |
| 2,999,678 | Heckethorn | Sept. 12, 1961 |
| 3,082,998 | Lange | Mar. 26, 1963 |

FOREIGN PATENTS

| | | |
|---|---|---|
| 811,556 | Great Britain | Apr. 8, 1959 |